United States Patent [19]

Beran et al.

[11] Patent Number: 4,988,783

[45] Date of Patent: Jan. 29, 1991

[54] ETHYLENE POLYMERIZATION USING SUPPORTED VANADIUM CATALYST

[75] Inventors: Debra L. Beran, Crosslanes, W. Va.; Kevin J. Cann, Belle Mead, N.J.; Robert J. Jorgensen, Dunbar, W. Va.; Frederick J. Karol, Belle Mead, N.J.; Norma J. Maraschin, Somerset, N.J.; Arthur E. Marcinkowsky, Charleston, W. Va.

[73] Assignee: Union Carbide Chemicals and Plastics Company Inc., Danbury, Conn.

[21] Appl. No.: 473,104

[22] Filed: Feb. 2, 1990

Related U.S. Application Data

[63] Continuation of Ser. No. 587,006, Mar. 13, 1984, abandoned, which is a continuation-in-part of Ser. No. 480,297, Mar. 29, 1983, Pat. No. 4,508,842.

[51] Int. Cl.$^5$ .......................... C08F 4/618; C08F 4/611
[52] U.S. Cl. ..................... 526/129; 526/141; 526/142; 526/133; 526/348; 526/348.5; 526/348.6; 526/901
[58] Field of Search ............... 502/119, 120, 123, 126, 502/127, 128; 526/129, 133, 141, 142, 144

[56] References Cited

U.S. PATENT DOCUMENTS 4,508,842  4/1985  Beran et al. .................... 526/142

Primary Examiner—Edward J. Smith
Attorney, Agent, or Firm—John S. Piscitello

[57] ABSTRACT

An ethylene polymerization catalyst comprising a supported precursor of vanadium trihalide/electron donor complex and alkylaluminum or boron halides, when combined with alkylaluminum cocatalyst and alkyl halide promoter, provides enhanced polymerization and productivity plus superior polyethylene.

16 Claims, No Drawings

ETHYLENE POLYMERIZATION USING SUPPORTED VANADIUM CATALYST

CROSS-REFERENCE TO RELATED APPLICATIONS

This application is a continuation of application Ser. No. 587,006, filed Mar. 13, 1984, now abandoned, which is a continuation-in-part of application Ser. No. 480,297, filed Mar. 29, 1983, now U.S. Pat. No. 4,508,842.

BACKGROUND OF THE INVENTION

1. Field of the Invention

This invention relates to an improved catalyst used in ethylene polymerization, and more particularly, to vanadium containing catalyst compositions having high activity and providing an improved process in the gas phase for producing polyethylenes having a desirable balance of properties useful in certain applications.

2. Description of the Prior Art

Polyethylenes having a relatively broad molecular weight distribution possess wide utility in the areas of wire and cable insulation, blow molding and pipe fabrication. Such broad molecular weight distribution polyethylenes, produced for example by the process disclosed in U.S. Pat. No. 3,324,095 (Carrick et al.), possess instability through the process of a relatively high level of unsaturation. Relatively narrow molecular weight distribution polyethylenes can be made in the gas phase as described in for example U.S. Pat. No. 4,302,565 (Goeke et al.) and U.S. Pat. No. 4,302,566 (Karol et al.). Such gas phase polymerization procedures use catalysts with high activity to produce polyethylene low in unsaturation and possessing high utility in various film applications. Such polyethylenes, however, have limited utility in other areas requiring the properties of increased melt flow and extrudability as well as lower melt fracture found in broad molecular weight distribution polyethylenes. It would therefore be desirable to develop a high activity catalyst composition and process for producing a highly saturated polyethylene in the gas phase having a broad molecular weight distribution.

Vanadium catalysts have been used to produce polyethylenes. U.S. Pat. No. 3,956,255 (Ort) disclosed an ethylene polymerization catalyst composition consisting essentially of a vanadium compound combined with an alkylaluminum alkoxide and a trialkylaluminum. This catalytic composition is deposited on silica which has been reacted with an alkylaluminum or an alkylaluminum alkoxide. Optionally, a halogenated alkane may be used as promoter.

U.S. Pat. No. 4,173,698 (Kanoh et al.) describes as ethylene polymerization catalyst which is the unsupported product of a vanadium trichloride-ether complex combined with an aluminum trihalide. An organoaluminum compound is used as cocatalyst.

U.S. Pat. No. 4,202,958 (Yamaguchi et al.) pertains to an ethylene polymerization process using an unsupported, solid catalyst obtained by reducing a vanadium halide with an organic aluminum compound in the presence of an ether compound. An organic aluminum cocatalyst is also provided.

U.S. Pat. No. 4,263,171 (Shida et al.) is representative of disclosures of olefin polymerization catalysts using magnesium containing compounds. The patent discloses a silica supported catalyst of a magnesium-aluminum alkyl complex and halogen-containing transition metal compound (including vanadium).

U.S. Pat. 4,294,947 (Doerk et al.) describes an ethylene/butene-1 copolymerization in a liquid butene-1 solvent using an unsupported catalyst comprising the reaction product of a vanadyl chloride and/or alkoxide with alkylaluminum chloride and organoaluminum cocatalysts.

Many of these references, representative of the prior art, are directed towards providing catalyst with the high activity or towards select improvements in particular polymerization procedures or polyethylene properties. Because of the complexity, it has not been possible, prior to the present invention, to provide a commercially useful, optimized process in the gas phase using a vanadium catalyst to produce polyethylenes having a desirable balance of properties. In order to provide such a process, the catalyst must be one that can, simultaneously: provide a superior hydrogen response in order to achieve very low levels of unsaturation in the polyethylene; provide a high degree of productivity such that the catalyst residues in the polyethylene are so small, preferably less than about 10 ppm of vanadium, so as to allow them to remain therein thereby avoiding catalyst removal steps: provide a polyethylene which can be readily molded in a variety of molding applications, i.e. provide a polyethylene having relatively broad molecular weight distribution and wide melt index range; provide enhanced copolymerization of ethylene with other alpha olefins to enable a wide range in density control of the polyethylene as well as a broaded range of comonomers which can be used; provide a polyethylene possessing a high bulk density in order to be commercially acceptable in handling and transportation costs; provide a polyethylene having a particle size which can be readily fluidized in a fluid bed reactor, and which is low in fines content; and provide freely-flowing particulate polyethylene free of fused or chunk-like agglomerations; while preferably using the simplest catalyst composition possible consisting essentially of a minimum number of components.

SUMMARY OF THE INVENTION

The present invention concerns a catalyst composition and process for producing polyethylene. The process comprises polymerizing ethylene with or without at least one $C_3$ to $C_{10}$ alpha-olefin monomer in the gas phase at a temperature between about 10° to about 115° C. The monomers are contacted with a catalyst composition comprising a specific supported precursor, cocatalyst and promoter. The supported precursor consists essentially of a particular class of vanadium compounds and modifiers which are impregnated on a solid, inert carrier.

DETAILED DESCRIPTION OF THE INVENTION

The invention relates to a high activity, catalyst composition and process for producing polyethylene. The polyethylene so produced possesses a superior balance of properties in fluidity, molecular weight distribution, bulk density, and saturation. Such polymers have a density and melt index which can be selected from among a broad range of densities and melt indices.

Polyethylene

The polyethylene prepared in the process of the present invention is ethylene homopolymer or copolymers of a major mole percent, i.e., at least about 50%, of ethylene, and a minor mole percent, i.e., no more than about 50%, of one or more $C_3$ to $C_{10}$ alpha-olefins. Preferred alpha-olefins are propylene, butene-1, hexene-1, 4-methylpentene-1 and octene-1. Additional monomers may be provided, including conjugated or nonconjugated dienes such as butadiene, 1,4 hexadiene and ethylidene norbornene.

The polyethylenes possess a desirable balance of properties. The polyethylenes can range in density from about 0.86 to about 0.96 g/cc. They can possess a melt index of between a no-flow value up to about 300 dg/min, and preferably from about 0.1 up to about 50 dg/min. These polymers possess a broad molecular weight distribution, defined as a weight average molecular weight/number average molecular weight ratio ($M_w/M_n$), of greater than about 10, and preferably between about 14 to about 22. These polymers also possess a high bulk density of at least about 20 lbs/ft$^3$, and preferably between about 24 to about 32 lbs/ft$^3$. The unsaturation level is very low, being much less than 1 carbon-carbon double bond per thousand carbon atoms (C=C/1000 C), preferably less than about 0.2 C=C/1000 C), and most preferably less than about 0.1 C=C/1000 C. The copolymers have a residual catalyst content, in terms of parts per million of vanadium metal, of less than about 10 ppm, and preferably less than about 6 ppm. The preferred polymers produced by the gas phase process of the present invention are freely-flowing, particulate solids, substantially free of fused or chunk-like agglomerations.

The polyethylenes of the present invention are useful in a wide variety of applications including blow molding, film and pipe manufacture, extrusion coating, as well as wire and cable applications.

Catalyst

The catalyst composition of the present invention comprises a supported precursor, a cocatalyst and a promoter. The supported precursor consists essentially of a vanadium compound and modifier impregnated on a solid, inert carrier. The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, VCl$_3$.

The electron donor is a liquid, organic Lewis base in which the vanadium trihalide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

The modifier used in the precursor has the formula:

$$MX_a \qquad (I)$$

wherein:
M is either boron or $AlR_{(3-a)}$ and wherein each R is independently alkyl, provided that the total number of aliphatic carbon atoms in any one R group may not exceed 14;
X is chlorine, bromine or iodine; and
a is 0, 1 or 2, with the provision that when M is boron a is 3.

Preferred modifiers include $C_1$ to $C_6$ alkylaluminum mono- and di- chlorides and boron trichloride. A particularly preferred modifier is diethyl aluminum chloride. About 0.1 to about 10, and preferably about 0.2 to about 2.5, moles of modifier are used per mole of electron donor.

The carrier is a solid, particulate porous material inert to the polymerization. The carrier consists essentially of silica or alumina, i.e., oxides of silicon or aluminum or mixtures thereof. Optionally, the carrier may contain additional materials such as zirconia, thoria or other compounds chemically inert to the polymerization or mixtures thereof.

The carrier is used as a dry powder having an average particle size of between about 10 to about 250, preferably about 20 to about 200, and most preferably about 30 to about 100, microns. The porous carrier has a surface area of greater than or equal to about 3, and preferably greater than or equal to about 50, m$^2$/g. A preferred carrier is silica having pore sizes of greater than or equal to about 80, and preferably greater than or equal to about 100, angstroms. The carrier is predried by heating to remove water, preferably at a temperature of greater than or equal to about 600° C.

The amount of carrier used is that which will provide a vanadium content of between about 0.05 to about 0.5 mmoles of vanadium per gram (mmole V/g), and preferably between about 0.2 to about 0.35 mmole V/g, and most preferably about 0.25 mmole V/g.

The carrier is ordinarily free of preparative chemical treatment by reaction with an alkylaluminum compound prior to the formation of the supported precursor. Such treatment results in the formation of aluminum alkoxides chemically bonded to the carrier molecules. We have discovered that the use of such a treated carrier in the catalyst composition and process of the present invention is not only nonessential, but instead results in undesirable agglomeration when used in the preparation of high density polyethylene (>0.94 g/cc), resulting in a chunk-like, non-freely flowing product.

In addition, we have also discovered that the presence of a magnesium compound in the supported precursor does not significantly raise catalyst activity, and is therefore a nonessential component.

The cocatalyst has the formula:

$$AlR_3 \qquad (II)$$

wherein R is as previously defined in the definition of M in equation I. Preferred cocatalysts include $C_2$ to $C_8$ trialkylaluminum compounds. A particularly preferred cocatalyst is triisobutyl aluminum. Between about 5 to about 500, and preferably between about 10 to about 50, moles of cocatalyst are used per mole of vanadium.

The promoter has the formula:

$$R'_bCX'_{(4-b)} \qquad (III)$$

wherein:
R' is hydrogen or unsubstituted or halosubstituted lower, i.e., up to about $C_6$ containing, alkyl;
X' halogen; and
b is 0, 1 or 2.

Preferred promoters include flouro, chloro or bromo substituted ethane or methane having at least 2 halogens attached to a carbon atom. Preferred promoters include CCl$_4$, CHCl$_3$, CH$_2$Cl$_2$, CBr$_4$, CFCl$_3$, CH$_3$CCl$_3$, and CF$_2$CLCCL$_3$. Particularly preferred promoters are methylene dichloride (CH$_2$Cl$_2$), 1,1,1,trichloroethane, (CH$_3$CCl$_3$), and chloroform (CHCl$_3$). Between about 0.1 to about 10, and preferably between about 0.2 to about 2, moles of promoter are used per mole of cocatalyst.

Catalyst Preparation

The catalyst composition of the present invention is produced by first preparing the supported precursor. In one embodiment, the vanadium compound is prepared by dissolving the vanadium trihalide in the electron donor at a temperature between about 20° C. up to the boiling point of the electron donor for a few hours. Preferably, mixing occurs at about 65° C. for about 3 hours or more. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between about 45° to about 90° C. for about 3 to 6 hours. The modifier, dissolved in an inert solvent, such as a hydrocarbon, is then mixed with the vanadium impregnated carrier. The liquid is removed by drying at temperatures of less than about 70° C. for a few hours, preferably between about 45° to about 65° C. for about 3 hours.

The cocatalyst and promoter are added to the supported precursor either before and/or during the polymerization reaction. The cocatalyst and promoter are added either together or separately, and either simultaneously or sequentially during polymerization. The cocatalyst and promoter are preferably added separately as solutions in inert solvents, such as isopentane, during polymerization.

Polymerization

The ethylene polymerization is conducted in the gas phase using those procedures well established in the art. It is preferred that the polymerization occur using a continuous, fluidized bed process. Using such a procedure, portions of the catalyst composition and monomers are fed to a reactor vessel from which polyethylene product is continuously removed. The density of the ethylene copolymer produced may be varied over a wide range depending upon the amount of alpha-olefin comonomer addition and upon the particular comonomer employed. The greater the mole percent of alpha-olefin added the lower the density.

The polymerization is conducted at a temperature below the sintering of the polyethylene. The operating temperature will range from between about 10° to about 115° C. Preferred operating temperatures will vary depending upon the polyethylene density which is desired. High density polyethylenes of greater than about 0.94 g/cc are produced at operating temperatures of between about 85° to about 115° C., and preferably at about 90° to about 100° C. Low density polyethylenes ranging in density from about 0.91 to about 0.94 g/cc are preferably produced at an operating temperature of between about 75° to about 90° C. Very low density polyethylenes of less than about 0.91 g/cc are preferably produced at an operating temperature of between about 10° to about 80° C. In the case of such very low density polyethylenes, it is necessary to dilute the reaction mixture with a large quantity of a diluent gas in order to prevent the formation of polymer agglomerates and sustain polymerization on a continuous basis, as described in copending U.S. patent applicant Ser. No. 587,005, entitled "Preparation of Low Density, Low Modulus Ethylene Copolymers in a Fluidized Bed", which disclosure is incorporated herein by reference.

The fluid bed reactor is operated at pressures of up to about 1000, and preferably between about 50 to about 350, psi.

A chain transfer agent, such as hydrogen, may be used to terminate the polymer chain. Usually the ratio of hydrogen to ethylene will vary between about 0.001 up to about 2.0 moles of hydrogen per mole of ethylene. We have discovered that hydrogen response is improved utilizing the catalyst composition of the present invention such that less hydrogen is required to produce polyethylene having extremely low unsaturation content.

EXAMPLES

The following examples are designed to illustrate the catalyst composition and process of the invention and are not intended as a limitation of the scope thereof.

The properties of the polymers produced in the examples were determined, unless otherwise indicated, by following the test procedures:

| Property | Test Procedure |
|---|---|
| Ash Content | Polyethylene is ashed and weighed; productivity can be calculated in pounds of polyethylene produced per pound of total catalyst. |
| Bulk Density (lb/ft$^3$) | ASTM-D-1895 (Method B). |
| Density (g/cc) | ASTM-1505, based on ASTM-D-1928 (Procedure C) plaque preparation. |
| Fines (wt. %) | Amount of polymer particles which pass through a 200 mesh screen. |
| Flow Index (dg/min) | ASTM D-1238-Condition F |
| Melt Flow Ratio | Flow Index/Melt Index; with melt index measured using ASTM D-1238, Condition E. |
| Particle Agglomeration | Based on visual observation of polyethylene product exiting from the reactor. |
| Unsaturation (C = C/1000 C.)$^a$ | Based on infrared spectrophotometric measurements of absorbance (at 10.35 microns for transvinylidine, 11.0 microns for terminal vinyl and 11.25 microns for pendant vinyl unsaturations) of 25 mil thickness pressings of polymer. Unsaturation concentration is proportional to absorbance per mil divided by absorptivity (as taken from absorptivity values published by R. J. deKock et al., in J. Polymer Science, Part B, 2, 339, 1964). |

Shorthand designations used in the Examples are defined as follows:

| Designation | Description |
|---|---|
| DEAC | Diethylaluminum chloride |
| ED | Electron donor compound |
| FI | Flow index |
| MFR | Melt flow ratio |
| STY | Space time yield |
| TEAL | Triethylaluminum |
| THF | Tetrahydrofuran |
| TIBA | Triisobutylaluminum |
| TnHAL | Tri-n-hexylaluminun |
| EADC | Ethylaluminum dichloride |

$^a$Number of carbon-carbon double bonds per 1000 carbon atoms

Catalyst Preparation

The catalyst compositions used in the Examples were prepared using the following standard procedures. To a flask containing 4 liters of anhydrous THF is added 34 g $VCl_3$ (0.216 moles). The mixture is stirred for 5 hrs. at 65° C. under a nitrogen blanket until the $VCl_3$ has dissolved. To this solution is added 800g of silica (dehydrated by heating to 600° C.) and stirring is continued for 4 hrs. at 65° C. In Comparative Examples A to D the silica had been chemically treated with 5.5 wt. % TEAL. The flask is vented and the solution is dried to the mud stage at 70° C. The temperature is dropped to 45° C. and a nitrogen purge is used for 6 hrs. or until a 4–10% by weight THF level is reached in the resulting product. The impregnated silica so produced is a free-flowing solid which has 0.25 mmoles of vanadium per gram. The solid is removed from the flask and stored under nitrogen.

Then, except in Comparative Example C, the modifier was introduced using the following procedure. To a flask containing 4 liters of anhydrous isopentane is added 500 g of the impregnated silica described above. To this mixture is added, with stirring, a 25 weight percent solution of diethylaluminum chloride, as modifier, in anhydrous hexane. The amount of modifier was employed in an amount sufficient to provide the number of moles of modifier per mole of THF in the vanadium compound as set forth in the Examples. This mixture is heated at 45° C. and purged with nitrogen for three hours or until the product is a free-flowing powder. The vanadium precursor so produced is then removed from the flask and stored under nitrogen.

Polymerization

The polyethylene was produced in a fluid bed reactor using the following standard procedure, under the operating conditions set forth in Table I. Ethylene was copolymerized with the comonomer set forth in the Examples. TIBA cocatalyst was added during polymerization as a 5 weight percent solution in isopentane. Chloroform, $CHCl_3$, was added, except in Comparative Example D, as a 5 weight percent solution in isopentane unless otherwise indicated, in proportion to the cocatalyst as set forth in the Examples.

Each polymerization was continuously conducted for greater than one hour after equilibrium was reached under a pressure of about 300 psig and at a gas velocity, a nitrogen gas concentration and temperature set forth in Table I.

EXAMPLES 1–8 AND COMPARATIVE EXAMPLES A–D

Using the procedures set forth above, and based on the parameters set forth in Table I, these examples were conducted using a variety of catalyst compositions to prepare high density ethylene copolymers. Examples 1–6 present embodiments of the present invention using butene-1 copolymerization. Examples 7 and 8 pertain to additional embodiments of the present invention using hexene-1 copolymerization. Comparative Examples A to D were conducted using an inert carrier which had been chemically treated with an alkylaluminum prior to impregnation. Comparative Example C was conducted using a catalyst composition without a modifier. Comparative Example D was conducted using a catalyst composition without a promoter.

An analysis of the polyethylene, using the above-described testing procedures, is set forth in Table I.

TABLE I
USE OF CLAIMED CATALYST AND COMPARATIVE DATA
PREPARATION OF HIGH DENSITY ETHYLENE COPOLYMERS

| | Example | | | | | |
|---|---|---|---|---|---|---|
| | 1 | 2 | 3 | 4 | 5 | 6 |
| Catalyst: | | | | | | |
| Modifier | DEAC | DEAC | DEAC | DEAC | DEAC | DEAC |
| Promoter | $CHCl_3$[a] | $CHCl_3$[a] | $CHCl_3$ | $CHCl_3$ | $CHCl_3$ | $CHCl_3$ |
| Modifier/THF Ratio | 0.9 | 0.9 | 0.9 | 0.9 | 0.9 | 0.9 |
| Carrier Pretreatment | Untreated | Untreated | Untreated | Untreated | Untreated | Untreated |
| Cocatalyst | TIBA | TIBA | TIBA | TIBA | TIBA | TIBA |
| Promoter/Cocatalyst Ratio | 2.0–2.22 | 2.0–2.22 | 2 | 2 | 2 | 1.66 |
| Al/V Ratio | 20–25 | 20–25 | 20–25 | 20–25 | 20–25 | 20–25 |
| Polymerization: | | | | | | |
| Temperature (°C.) | 100° | 100° | 100° | 100° | 90° | 100° |
| Gas velocity (ft/sec) | 2 | 2 | 2 | 2 | 2 | 2 |
| $N_2$ pressure (mole %) | 10 | 10 | 10 | 10 | 10 | 10 |
| Comonomer | Butene-1 | Butene-1 | Butene-1 | Butene-1 | Butene-1 | Butene-1 |
| Comonomer/$C_2H_4$ Ratio | 0.006 | 0.006 | 0.002 | 0.002 | 0.006 | 0.002 |
| $H_2/C_2H_4$ Ratio | 0.061 | 0.05 | 0.051 | 0.046 | 0.045 | 0.028 |
| STY (lb/hr-$ft^3$) | 6.6 | 6.4 | 5.6 | 6.4 | 7.2 | 8.0 |
| Polyethylene: | | | | | | |
| Density (g/cc) | 0.957 | 0.958 | 0.958 | 0.958 | 0.956 | 0.954 |
| FI (dg/min) | 33–38 | 23–27 | 34–38 | 23–27 | 35–38 | 23–25 |
| MFR | 70–75 | 70–75 | 70–75 | 70–75 | 90–95 | 70–75 |
| Bulk Density (lb/$ft^3$) | 26.5 | 26.5 | 28 | 28 | 27 | 27.5 |
| Fines (wt. %) | 0.01 | 0.01 | 0.01 | 0.01 | 0.01 | 0.01 |
| Ash (wt. %) | 0.05 | 0.05 | 0.052 | 0.052 | 0.050 | 0.048 |
| Particle Agglomeration | Minor to none | Minor to none | Minor to none | Minor to none | Minor to none | Minor to none |

Comments: All Examples 1–8 produced polyethylene with high bulk density, low fines content, low ash content (i.e. high catalyst activity), good particle fluidity (no agglomeration problem) and had good hydrogen response (shown by low $H_2$/Monomer Ratios)

[a] using 1 wt % (instead of 5 wt %) solution in isopentane.

| | Example | | | | | |
|---|---|---|---|---|---|---|
| | 7 | 8 | A | B | C | D |
| Catalyst: | | | | | | |
| Modifier | DEAC | DEAC | DEAC | DEAC | None | DEAC |
| Promoter | $CHCl_3$ | $CHCl_3$ | $CHCl_3$ | $CHCl_3$ | $CHCl_3$ | None |

TABLE I-continued
USE OF CLAIMED CATALYST AND COMPARATIVE DATA PREPARATION OF HIGH DENSITY ETHYLENE COPOLYMERS

| | | | | | | |
|---|---|---|---|---|---|---|
| Modifier/THF Ratio | 0.9 | 0.9 | 0.25 | 0.95 | — | 0.95 |
| Carrier Pretreatment | Untreated | Untreated | Treated | Treated | Treated | Treated |
| Cocatalyst | TIBA | TIBA | TIBA | TIBA | TIBA | TIBA |
| Promoter/Cocatalyst Ratio | 1.33 | 1.33 | 1 | 2 | 2 | — |
| Al/V Ratio | 20-25 | 20-25 | 20 | 20 | 25 | 12 |
| Polymerization: | | | | | | |
| Temperature (°C.) | 100° | 90° | 100° | 100° | 100° | 100° |
| Gas velocity (ft/sec) | 2 | 2 | 1.9 | 1.9 | 1.1 | 1.9 |
| $N_2$ pressure (mole %) | 16.5 | 20 | 15 | 15 | 15 | 15 |
| Comonomer | Hexene-1 | Hexene-1 | Butene-1 | Butene-1 | Butene-1 | Butene-1 |
| Comonomer/$C_2H_4$ Ratio | 0.010 | 0.011 | 0.002 | 0.002 | 0.002 | 0.009 |
| $H_2/C_2H_4$ Ratio | 0.022 | 0.038 | 0.043 | 0.03 | 0.07* | 0.14* |
| STY(lb/hr-ft$^3$) | 3.7 | 3.8 | 5.5 | 4 | 4 | 4 |
| Polyethylene: | | | | | | |
| Density (g/cc) | 0.945 | 0.943 | 0.956-8 | 0.956-8 | 0.956-8 | 0.956 |
| FI (dg/min) | 5-6 | 5-6 | 20-22 | 20-22 | 20-22 | 20-22 |
| MFR | 70-75 | 90-95 | 70-75 | 70-75 | 70-75 | 75 |
| Bulk Density (lb/ft$^3$) | 26.5 | 27.5 | 26-27 | 28-29 | 20-21* | 32 |
| Fines (wt. %) | 0.01 | 0.01 | 0.08 | 0.05 | 8* | 6* |
| Ash (wt. %) | 0.036 | 0.036 | 0.036 | 0.025-0.030 | 0.040-0.045 | 0.062* |
| Particle Agglomeration | Minor to none | Minor to none | Severe* | Severe* | None | None |
| Comments: | | | *Examples A & B demonstrated severe agglomeration problems | | *Inferior hydrogen response, bulk density and fines | *Inferior hydrogen response, fines and activity |

The results set forth in Table I indicate that the catalyst composition of the present invention provides high activity as demonstrated by the low ash values, as well as a desirable balance of product properties, demonstrated by lower $H_2$/monomer ratios (improved hydrogen response), higher bulk densities, improved particle fluidity, and lower fines content. In contrast, the particle agglomeration in Comparative Examples A and B was discovered to be particularly severe involving catalyst compositions similar to those of the present invention, but which utilized carrier which had been pretreated with alkylaluminum compounds. In addition, without the presence of a modifier as in Comparative Example C, hydrogen response decreases (as shown by an increase in $H_2$/monomer ratio), bulk density is lowered and the fines content is greater, all at less desirable values. Similarly, in the absence of the promoter as in Comparative Example D, the hydrogen response is less, the fines content is greater and the catalyst activity is lowered, all to less desirable values.

EXAMPLE 9 AND COMPARATIVE EXAMPLES E AND F

These examples set forth and compare the superior saturation properties of polyethylene produced using the catalyst composition and process of the present invention, with the results set forth in Table II. Using those procedures set forth above, Example 9 was conducted to produce an ethylene/butene copolymer having the designated level of unsaturation. Comparative Example E was conducted under similar procedures using TEAL as cocatalyst, but without DEAC modifier. The polyethylene produced by the present invention contains superior low unsaturation levels even when compared with a highly similar catalyst composition as in Example E.

For comparative purposes, Example F sets forth the saturation content of polyethylene produced by an alternative process of the prior art, and is shown to possess a significantly higher level of unsaturation leading to instability of the polymer which degrades over time. In contrast, polyethylene produced by the catalyst composition and the process of the present invention has been shown to exhibit superior stability due to the very low saturation content in the polymer.

TABLE II
POLYETHYLENE UNSATURATION COMPARISION

| | Example 9 | Comparative | |
|---|---|---|---|
| | | E | F |
| | | Catalyst | |
| | Modified$^a$ V | Unmodified$^b$ V | Silyl-chromate$^c$ |
| Unsaturation: (C = C/10000 C.) | | | |
| Trans vinyl | 0.0108 | 0.0197 | 0.038 |
| Terminal vinyl | 0.0104 | 0.0508 | 1.148 |
| Pendant vinylidene | 0.0619 | 0.0812 | 0.106 |
| Total | 0.0831 | 0.1517 | 1.292 |

$^a$using VCl$_3$/THF/SiO$_2$/DEAC/TIBA/CHCl$_3$ catalyst of the present invention
$^b$using VCl$_3$/THF/SiO$_2$/TEAL/CHCl$_3$ catalyst; at 90° C. polymerization temperature
$^c$using polymerization process of U.S. Pat. No. 3,324,095 (Carrick et al.)

EXAMPLES 10-13

Using the procedures set forth above, and based on the parameters set forth in Table III, these examples were conducted to prepare low density ethylene copolymers. Examples 10-12 illustrate the copolymerization of ethylene with butene-1. Example 13 illustrates the copolymerization of ethylene with propylene. TEAL was employed as the cocatalyst in each of these examples. The results set forth in Table III indicate that the catalyst composition of the present invention provides high activity and a desirable balance of product properties in the preparation of low density ethylene copolymers as well as high density ethylene copolymers.

lymerized the hexene-1 using catalyst compositions employing tri-n-hexylaluminum, ethylaluminum dichloride and triethylaluminum as modifiers. The modifiers were used to treat $VCl_3$-impregnated silica containing 0.2 mmoles of vanadium per gram of combined weight of the $VCl_3$ and silica. TEAL was employed as the cocatalyst in each of these examples. The results set forth in Table V indicate that various modifiers may be used in the catalyst compositions of the present invention.

TABLE III
PREPARATION OF LOW DENSITY ETHYLENE COPOLYMERS

| | Example | | | |
|---|---|---|---|---|
| | 10 | 11 | 12 | 13 |
| Catalyst: | | | | |
| Modifier | DEAC | DEAC | DEAC | DEAC |
| Promoter | $CHCl_3$ | $CHCl_3$ | $CHCl_3$ | $CHCl_3$ |
| Modifier/THF Ratio | 1.0 | 1.0 | 1.0 | 1.0 |
| Carrier Pretreatment | Untreated | Untreated | Untreated | Untreated |
| Cocatalyst | TEAL | TEAL | TEAL | TEAL |
| Promoter/Cocatalyst Ratio | 1.54 | 1.31 | 1.22 | 1.0 |
| Al/V Ratio | 40 | 40 | 40 | 35 |
| Polymerization: | | | | |
| Temperature (°C.) | 85° | 85° | 85° | 90° |
| Comonomer | Butene-1 | Butene-1 | Butene-1 | Propylene |
| Comonomer/$C_2H_4$ Ratio | 0.139 | 0.086 | 0.054 | 0.13 |
| $H_2/C_2H_4$ Ratio | 0.026 | 0.016 | 0.014 | 0.02 |
| STY (lb/hr-ft$^3$) | 5.2 | 5.1 | 5.1 | 4.2 |
| Polyethylene: | | | | |
| Density (g/cc) | 0.915 | 0.922 | 0.927 | 0.922 |
| FI (dg/min) | 459 | 9.5 | 3.4 | 19 |
| MFR | 49 | — | — | — |
| Bulk Density (lb/ft$^3$) | 23.6 | 23.4 | 23.6 | 28 |
| Fines (wt. %) | 0 | 0 | 0 | 0 |
| Ash (wt. %) | 0.039 | 0.071 | 0.082 | 0.10 |
| Particle Agglomeration | Minor to none | Minor to none | Minor to none | Minor to none |

EXAMPLES 14–19

Using the procedures set forth above, and based on the parameters set forth in Table IV, these examples were conducted to prepare very low density copolymers of ethylene and propylene. TEAL was substituted for TIBA as the cocatalyst in Example 14. The results set forth in Table IV indicate that the catalyst composition of the present invention may also be used to provide very low density ethylene copolymers having a desirable balance of product properties at high activity.

TABLE IV
PREPARATION OF VERY LOW DENSITY ETHYLENE COPOLYMERS

| | Example | | | | | |
|---|---|---|---|---|---|---|
| | 14 | 15 | 16 | 17 | 18 | 19 |
| Catalyst: | | | | | | |
| Modifier | DEAC | DEAC | DEAC | DEAC | DEAC | DEAC |
| Promoter | $CHCl_3$ | $CHCl_3$ | $CHCl_3$ | $CHCl_3$ | $CHCl_3$ | $CHCl_3$ |
| Modifier/THF Ratio | 1.7 | 1.7 | 1.7 | 1.7 | 1.7 | 1.7 |
| Carrier Pretreatment | Untreated | Untreated | Untreated | Untreated | Untreated | Untreated |
| Cocatalyst | TEAL | TIBA | TIBA | TIBA | TIBA | TIBA |
| Promoter/Cocatalyst Ratio | 1.0 | 1.0 | 1.0 | 1.0 | 1.0 | 1.0 |
| Al/V Ratio | 40 | 40 | 40 | 40 | 43 | 45 |
| Polymerization: | | | | | | |
| Temperature (°C.) | 75° | 70° | 65° | 50° | 40° | 36° |
| Gas Velocity (ft/sec) | 1.5 | 1.5 | 1.5 | 1.5 | 1.5 | 1.5 |
| $N_2$ pressure (mole %) | 45 | 50 | 59 | 57 | 60 | 60 |
| Comonomer | Propylene | Propylene | Propylene | Propylene | Propylene | Propylene |
| Comonomer/$C_2H_4$ Ratio | 0.22 | 0.24 | 0.26 | 0.35 | 0.31 | 0.34 |
| $H_2/C_2H_4$ Ratio | 0.01 | 0.007 | 0.006 | 0.006 | 0.002 | trace |
| STY (lb/hr-ft$^3$) | 4.1 | 4.7 | 3.8 | 2.7 | 4.3 | 4.2 |
| Polyethylene: | | | | | | |
| Density (g/cc) | 0.906 | 0.895 | 0.894 | 0.882 | 0.871 | 0.865 |
| FI (dg/min) | 27 | 9 | 6 | 20 | 3 | 1 |
| MFR | 41 | 53 | 64 | 51 | — | — |
| Bulk Density (lb/ft$^3$) | 27 | 24 | 23 | 20 | 23 | 23 |
| Fines (wt. %) | — | — | 0.05 | 0 | 0 | 0 |
| Ash (wt. %) | 0.10 | 0.082 | 0.11 | — | 0.14 | 0.07 |

EXAMPLES 20–22

Using the procedures set forth above, and based on the parameters set forth in Table V, ethylene was copo-

TABLE V
USE OF CATALYSTS WITH VARIOUS MODIFIERS

| | Example | | |
|---|---|---|---|
| | 20 | 21 | 22 |
| Catalyst: | | | |
| Modifier | TnHAL | EADC | TEAL |

TABLE V-continued
USE OF CATALYSTS WITH VARIOUS MODIFIERS

| | Example | | |
|---|---|---|---|
| | 20 | 21 | 22 |
| Promoter | CHCl$_3$ | CHCl$_3$ | CHCl$_3$ |
| Modifier/THF Ratio | 0.84 | 0.84 | 0.84 |
| Carrier Pretreatment | Untreated | Untreated | Untreated |
| Cocatalyst | TEAL | TEAL | TEAL |
| Promoter/Cocatalyst Ratio | 1.1 | 1.1 | 1.0 |
| Al/V Ratio | 102 | 37 | 38 |
| Polymerization: | | | |
| Temperature (°C.) | 90° | 90° | 90° |
| Gas Velocity (ft/sec) | 1.8 | 1.8 | 1.8 |
| N$_2$ pressure (mole %) | 4 | 10 | 11.3 |
| Comonomer | Hexene-1 | Hexene-1 | Hexene-1 |
| Comonomer/C$_2$H$_4$ Ratio | 0.0018 | 0.018 | 0.003 |
| H$_2$/C$_2$H$_4$ Ratio | 0.068 | 0.067 | 0.076 |
| STY (lb/hr-ft$^3$) | 4.3 | 8.0 | 6.4 |
| Polyethylene: | | | |
| Density (g/cc) | 0.957 | 0.955 | 0.957 |
| FI (dg/min) | 28–30 | 27–29 | 23–24 |
| MFR | 90–95 | 95–100 | 90–100 |
| Bulk Density (lb/ft$_3$) | 29.0 | 28.2 | 29.2 |
| Fines (wt. %) | 3.4$^a$ | 3.3$^a$ | 1.6$^a$ |
| Ash (wt. %) | 0.041 | 0.056 | 0.054 |
| Particle Agglomeration | Minor to none | Minor to none | Minor to none |

$^a$through 120 mesh screen (instead of 200)

We claim:

1. A process for producing ethylene polymers which comprises polymerizing ethylene with or without at least one C$_3$ to C$_{10}$ alpha-olefin monomer in the gas phase at a temperature between about 10° C. to about 115° C., by contacting the monomers with a catalyst composition comprising:
   (A) a supported precursor consisting essentially of a vanadium compound and modifier impregnated on a solid, inert carrier, said carrier consisting essentially of silica or alumina and being free of preparative chemical treatment with an alkylaluminum compound prior to formation of the supported precursor, said supported precursor composition being prepared by impregnating said carrier first with the vanadium compound and subsequently with the modifier,
   (1) said vanadium compound being the reaction product of:
       (a) a vanadium trihalide of chlorine, bromine or iodine; and
       (b) an electron donor which is a liquid, organic Lewis base in which said vanadium trihalide is soluble, said electron donor being selected from the group consisting of alkyl esters of aliphatic and aromatic carboxylic acids, aliphatic ketones, aliphatic amines, alkyl and cycloalkyl ethers, and mixtures thereof; and
   (2) said modifier having the formula:

MX$_a$ wherein:
   M is AlR$_{(3-a)}$ and wherein each R is independently alkyl, provided that the total number of aliphatic carbon atoms in any one R group may not exceed 14;
   X is chlorine, bromine or iodine; and
   a is 1 or 2; and said modifier being employed in an amount of from 0.2 to 2.5 moles per mole of electron donor present in said vanadium compound;

(B) a cocatalyst having the formula:

AlR$_3$ wherein
   R is as previously defined; and
   (C) a promoter having the formula:

R′$_b$CX′$_{(4-b)}$ wherein:
   R′ is hydrogen or unsubstituted or halosubstituted lower alkyl;
   X′ is halogen; and
   b is 0, 1 or 2.

2. The process of claim 1 wherein said ethylene polymer is an ethylene homopolymer, propylene/ethylene, butene-1/ethylene or hexene-1/ethylene copolymer.

3. The process of claim 1 wherein said vanadium trihalide contains chlorine; said electron donor is an alkyl or cycloalkyl ether; said modifier is a C$_1$ to C$_6$ alkylaluminum mono- or di- chloride; said carrier is silica; said cocatalyst is a C$_2$ to C$_8$ trialkylaluminum; and said promoter is a fluoro, chloro or bromo substituted ethane or methane.

4. The process of claim 1 wherein said vanadium trihalide is vanadium trichloride; said electron donor is tetrahydrofuran; said modifier is diethylaluminum chloride; said carrier is silica; said cocatalyst is triisobutylaluminum or triethylaluminum; and said promoter is chloroform.

5. The process of claim 1 wherein an ethylene polymer having a density of greater than about 0.94 g/cc is produced at a temperature of between about 85° C. to about 115° C.

6. The process of claim 5 wherein said ethylene polymer is an ethylene homopolymer, propylene/ethylene, butene-1/ethylene or hexene-1/ethylene copolymer.

7. The process of claim 5 wherein said vanadium trihalide contains chlorine; said electron donor is an alkyl or cycloalkyl ether; said modifier is a C$_1$ to C$_6$ alkylaluminum mono- or di- chloride; said carrier is silica; said cocatalyst is a C$_2$ to C$_8$ trialkylaluminum; and said promoter is a fluoro, chloro or bromo substituted ethane or methane.

8. The process of claim 5 wherein said vanadium trihalide is vanadium trichloride; said electron donor is tetrahydrofuran; said modifier is diethylaluminum chloride; said carrier is silica; said cocatalyst is triisobutylaluminum or triethylaluminum; and said promoter is chloroform.

9. The process of claim 1 wherein an ethylene polymer having a density of from about 0.91 g/cc to about 0.94 g/cc is produced at a temperature of between about 75° C. to about 90° C.

10. The process of claim 9 wherein said ethylene polymer is propylene/ethylene butene-1/ethylene or hexene-1/ethylene copolymer.

11. The process of claim 9 wherein said vanadium trihalide contains chlorine; said electron donor is an alkyl or cycloalkyl ether; said modifier is a C$_1$ to C$_6$ alkylaluminum mono- or di- chloride; said carrier is silica; said cocatalyst is a C$_2$ to C$_8$ trialkylaluminum; and said promoter is a fluoro, chloro or bromo substituted ethane or methane.

12. The process of claim 9 wherein said vanadium trihalide is vanadium trichloride; said electron donor is tetrahydrofuran; said modifier is diethylaluminum chloride; said carrier is silica; said cocatalyst is triisobutylaluminum or triethylaluminum; and said promoter is chloroform.

13. The process of claim 1 wherein an ethylene polymer having a density of less than about 0.91 g/cc is produced at a temperature of between about 10° C. to about 80° C.

14. The process of claim 13 wherein said ethylene polymer is an propylene/ethylene butene-1/ethylene or hexene-1/ethylene copolymer.

15. The process of claim 13 wherein said vanadium trihalide contains chlorine; said electron donor is an alkyl or cycloalkyl ether; said modifier is a $C_1$ to $C_6$ alkylaluminum mono- or di- chloride; said carrier is silica; said cocatalyst is a $C_2$ to $C_8$ trialkylaluminum; and said promoter is a fluoro, chloro or bromo substituted ethane or methane.

16. The process of claim 13 wherein said vanadium trihalide is vanadium trichloride; said electron donor is tetrahydrofuran; said modifier is diethylaluminum chloride; said carrier is silica; said cocatalyst is triisobutylaluminum or triethylaluminum; and said promoter is chloroform.

* * * * *